Aug. 11, 1953  M. M. BARKSDALE  2,648,359
HYDRAULICALLY CONTROLLED FEED FOR SAWMILLS
Filed Sept. 24, 1951  3 Sheets-Sheet 1

Inventor
Malvin M. Barksdale
By
Lancaster, Allwine Rommel
Attorneys

Inventor
Malvin M. Barksdale
By
Lancaster, Allwine & Rommel
Attorneys

Aug. 11, 1953   M. M. BARKSDALE   2,648,359
HYDRAULICALLY CONTROLLED FEED FOR SAWMILLS
Filed Sept. 24, 1951   3 Sheets-Sheet 3

Inventor
Malvin M. Barksdale
By
Lancaster, Allwine & Rommel
Attorneys

Patented Aug. 11, 1953

2,648,359

UNITED STATES PATENT OFFICE 2,648,359

HYDRAULICALLY CONTROLLED FEED FOR SAWMILLS

Malvin M. Barksdale, Amity, Ark.

Application September 24, 1951, Serial No. 248,007

2 Claims. (Cl. 143—106)

1

This invention relates to saw mill carriage feed mechanism and particularly to a hydraulically controlled feed equipment and operated from the main power source and which may be positioned under the carriage tracks or in any convenient location with respect thereto and of course determined by the position of the power applied thereto with its operating control lever positioned preferably adjacent to the saw location or any other point in the mill as may be desired.

The primary object of my invention is to provide a hydraulically controlled feed unit which will be smooth in operation wherein the feed is much safer and faster than the feed arrangements now available, start and stop the carriage quicker and will give a carriage speed up to twenty-eight feet per second, thereby speeding up lumber production 40% over the ordinary feed.

Most other feeds have reversing gears which wear fast and have a tendency to jerk the carriage which is obviated by the hydraulically operated feed unit in accordance with my invention which affords a smooth operation of the carriage much smoother even than a shot-gun feed and as fast.

A further object is to provide such a hydraulically operated feed unit which is simple and compact in construction and can be produced at a low cost and easily operated with a low upkeep cost.

Further objects and advantages will appear in the following detailed description of a highly practical construction of a saw mill hydraulically operated feed unit in acordance with my invention and illustrated in the accompanying drawings forming a part of this specification.

Figure 1:
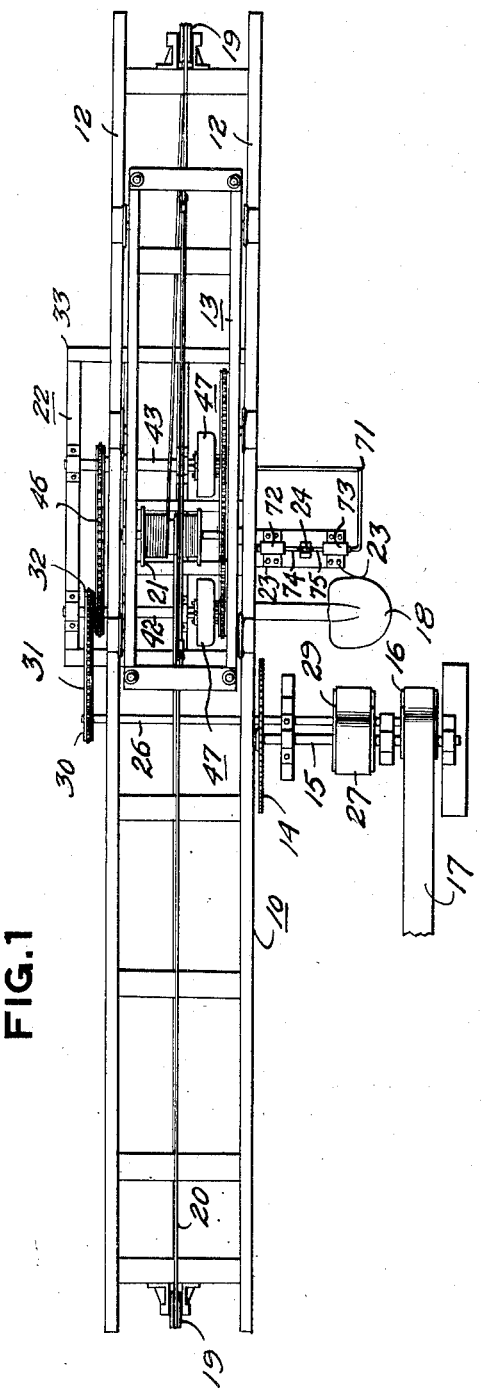
Fig. 1 is a plan view of a saw mill equipped with a hydraulically operated feed unit in accordance with my invention.
Figure 2:
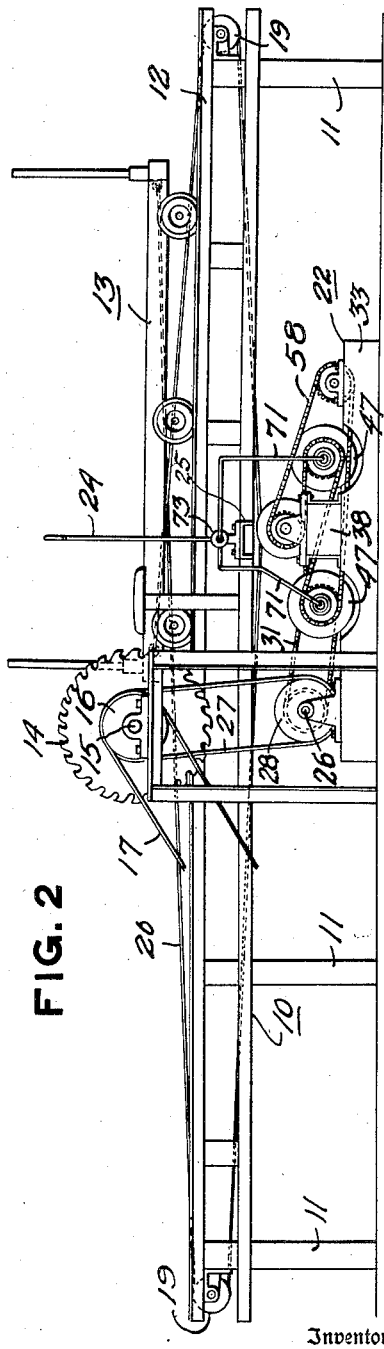
Fig. 2 is a side elevation of the same.
Figure 3:
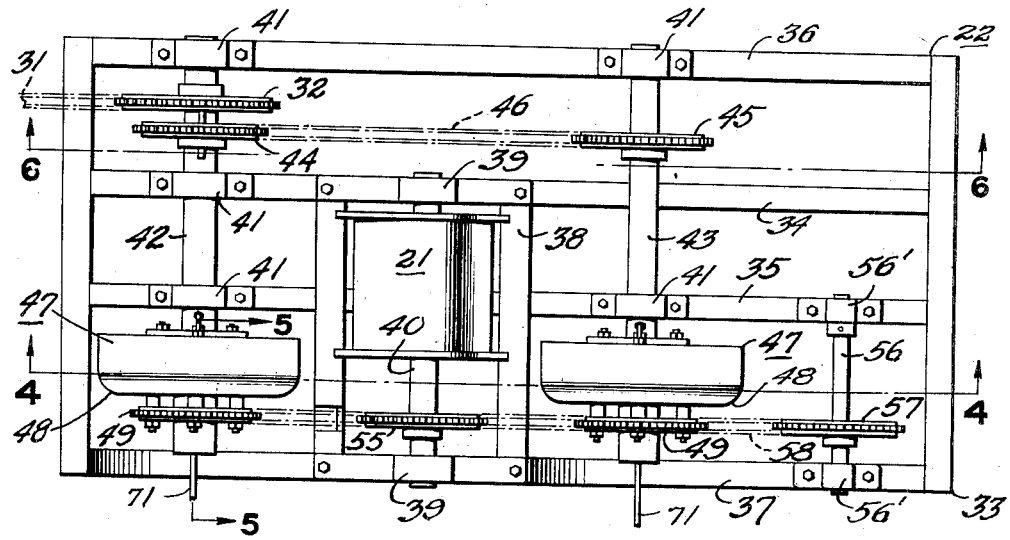
Fig. 3 is a plan view on an enlarged scale of the hydraulically operated feed unit.

Referring to Figs. 1 and 2 of the drawings a

2 conventional type of saw mill is illustrated generally comprising a base frame structure 10 supported at a suitable elevation by columns 11 and carrying carriage track 12 upon which the saw mill carriage 13 is reciprocably longitudinally movable. The saw 14 on its drive shaft 15 is suitably mounted so as to be alongside the carriage track in the usual manner and is shown provided with driven pulley 16 and a belt 17 which is driven from a source of power not shown.

The base frame structure 10 carries a seat 18 providing an operator's station for the saw mill operator in a position adjacent to the saw and where various conventional controls, not shown, are at his command in such position. At each end of base frame structure 10 is a cable sheave 19 about which sections of driving cable 20 is trained. The ends of the cable above the carriage track 12, are connected with carriage 13 and the lower portions of the cable, below the carriage track lead to and have end portions connected to and wound about a driving drum 21 in a hydraulically controlled feed unit 22 in accordance with my invention.

While this hydraulically controlled feed unit may be mounted in any desired position with respect to the saw mill and the cable driving drum 21 connected to drive the cables 20, alongside the mill, or even on the outer end of an extending drive shaft, as shown the unit is positioned under the base frame structure 10 and the controls 23 and operating lever 24 are carried by a base 25 mounted on the base frame structure 10 in a position so that the control lever 24 will be accessible to the operator on seat 18. Although a separate source of power for operating the unit may be employed, a preferred construction suitably includes a driving shaft 26 deriving its power from the saw drive shaft 15 by means of a belt 27 trained about pulleys 28 and 29 on these shafts respectively. Driving shaft 26 is mounted so as to extend under the base frame structure 10 and has a drive sprocket 30 thereon and a chain 31 on this sprocket and a driving sprocket 32 of the unit provides continuous driving power for the unit from the main power supply for the saw 14.

Details of a hydraulically controlled feed unit 22 which has been found to be highly satisfactory in operation are shown in Figs. 3 to 6 inclusive. This unit includes a rectangular base 33 with inner longitudinal frame members 34 and 35 intermediate the side members 36 and 37 of base 33. These members 34 to 37 inclusive provide base supports for shaft bearings and a mounting for an elevated support 38 upon which bearings 39 for drum shaft 40 upon which drum 21 is secured.

The base members 34, 35 and 36 are each provided with bearing blocks 41 for two drive shafts 42 and 43, one shaft 42 adjacent to an end of base 33 and the other shaft 43 beyond the cable drum 21. Driving sprocket 32 is keyed to shaft 42 and likewise a sprocket 44. A sprocket 45 similar to sprocket 44, although if desired it may be of a different size to provide a different speed ratio, is keyed to shaft 43, and a chain 46 on sprockets 44 and 45 provides for the driving of both shafts 42 and 43 when power is transmitted to sprocket 32 on shaft 42.

Figure 7:
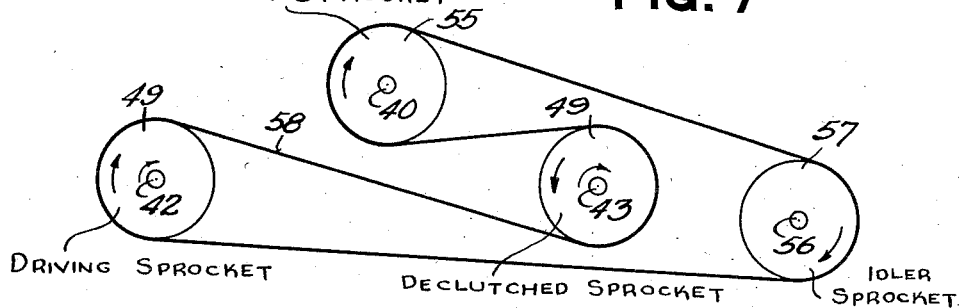
Figs. 7 and 8 are schematic diagrams illustrating the driving of the cable drum in opposite directions.
Figure 8:
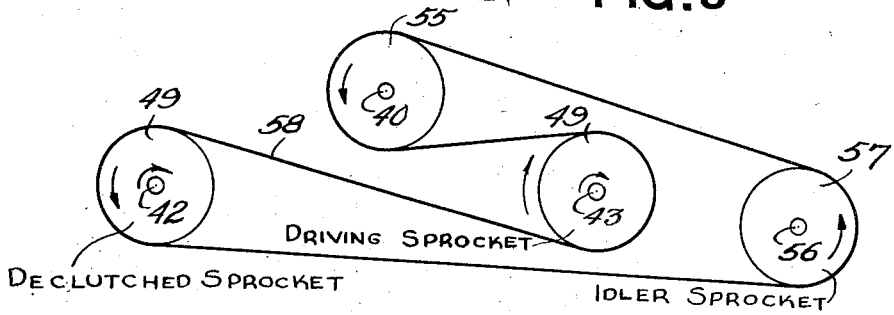

The inner ends of drive shafts 42 and 43 are each provided with a fluid operated clutch 47, the drum 48 of which carries a driving sprocket 49 secured to the disk portion 50 and flange 51 of a cylindrical hub 52 thereof by bolts 53, spacers 54 and the outer end of the hub 52 maintaining the sprocket in proper position theron. A sprocket 55 is mounted on the cable driving drum shaft 40 in the same vertical plane of the two sprockets 49 and a shaft 56 mounted in bearings 56' secured to base members 35 and 37 beyond driving shaft 43 carries an idling sprocket 57 likewise in the same vertical plane with sprockets 49 and 55. A chain 58 is trained about sprockets 49, 55 and 57 as best indicated in Figs. 7 and 8 so that when the clutch 47 is drivingly connected with drive shaft 42 (see Fig. 7) the drive of chain 58 will be such as to drive sprocket 55 and thereby the cable drum 21 in a clockwise direction, and when the clutch 47 connects the sprocket 49 of drive shaft 43 to be driven thereby the cable drum is driven in the opposite direction (Fig. 8). Of course when both clutches are released the sprockets are both disconnected from the respective driven shafts 42 and 43 and the cable drum will remain stationary. In Figures 7 and 8 it will be noted that the direction of rotation of the sprocket wheels in each instance is denoted by arrows adjacent to their peripheries but in each instance the direction of rotation of shafts 42 and 43 is the same, in a clockwise direction as denoted by the small arrows adjacent to these shafts. The driven pulley or sprocket 55 for operating the carriage drum is driven clockwise in Fig. 7 where shaft 42 is driving and shaft 43 is declutched from its sprocket 49, and counter clockwise in Fig. 8 where shaft 43 is the driving shaft and the sprocket 49 on shaft 42 is idling.

Figure 4:
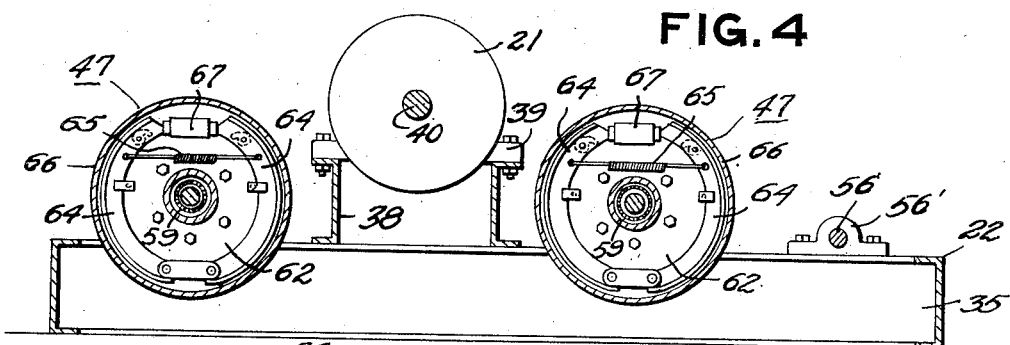
Fig. 4 is a vertical sectional view thereof taken substantially along line 4—4 of Fig. 3.
Figure 5:
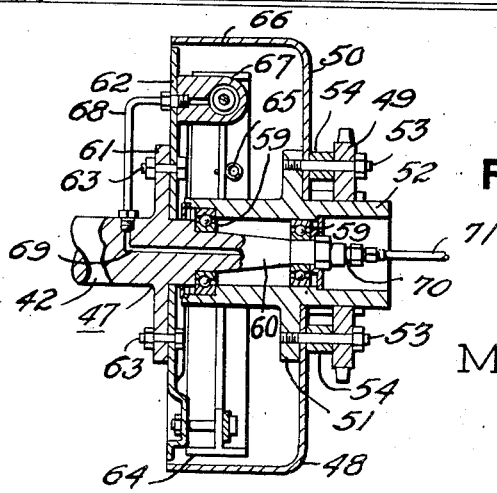
Fig. 5 is a fragmental sectional view of a clutch element thereof taken on line 5—5 of Fig. 3.
Figure 6:
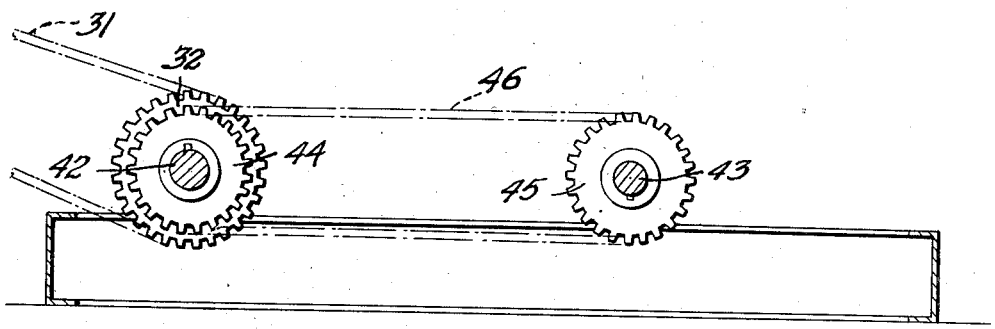
Fig. 6 is a sectional view taken on line 6—6 of Fig. 3.

Clutches 47 as shown in Figs. 4 and 5 are preferably as illustrated hydraulically operated and include the hub 52 and its drum 48 heretofore referred to which are provided with ball bearing mounting means 59 on a conically tapered end 60 of the drive shaft (42, 43). The drive shaft (42, 43) is provided with a radial flange 61 to which a disk 62 is secured by bolts 63. Disk 62 carries clutch shoes 64 yieldably held in retracted position by a spring 65 but expanded to engage the rim 66 of drum 48 by a fluid cylinder means 67 carried by disk 62 between ends of the clutch shoe elements. As this particular construction is common in fluid operated automobile brakes the details of construction and specific arrangement of parts will not be described in detail.

In order to supply fluid pressure to the clutch shoe operating fluid cylinder 67 a conduit 68 leads therefrom to bore 69 in the rotating drive shaft (42, 43) which bore extends longitudinally through the conically tapered outer end 60 thereof. A rotary sealing member 70 of the type shown in the reissue Patent 23,283 of October 17, 1950, to L. H. Brown by way of example affords communication between bore 69 and a conduit 71 which leads to a source of clutch operating fluid pressure.

As shown in Figs. 1 and 2 the conduits 71 of each of these fluid operated clutches 47 leads to an individual operating cylinder 72 for the clutch 47 on drive shaft 42 and 73 for the clutch 47 on drive shaft 43. These operating cylinders are of the type of automotive master brake cylinders and will not be described in detail except to point out that they are positioned in alignment with their piston operating rods 74 and 75 respectively projecting toward each other and arranged so as to be alternately operatively engaged by the operating control lever 24. In this way the piston of either master cylinder may be operated to supply fluid pressure to the corresponding clutch 47 for affording a driving connection with the sprocket 49 of one or the other drive shafts 42 or 43 and of course when lever 24 is in an upright or neutral position both clutches 47 are released and the cable drum 21 will remain stationary.

From the foregoing it will be seen that the feed control unit in accordance with my invention is of simple construction from the standpoint of production as several of the parts are readily obtainable on the market and require little alteration in order to produce the unit. In use it provides an operator for the carriage which is smooth and fast in operation with forward and retracting speeds at any desired ratio depending on the gear ratio of the sprockets 44 and 45 on the drive shafts 42 and 43; equal size being shown produces the same speeds forward and retracting of the carriage as controlled by mere fingertip pressure on the control lever 24.

I claim:

1. A feed unit for saw mill carriages and the like including a base, a cable drum and its shaft mounted on said base for rotation in either direction, which drum has carriage operating cables wound thereon, a pair of drive shafts rotatably mounted on said base, one on each side of said drum and its shaft, means for continuously driving said drive shafts in the same direction, a rotatable hydraulically operated clutch on each of said drive shafts, a sprocket wheel on each of said clutches and on the cable drum shaft, an idling shaft rotatably mounted on said base beyond one of said drive shafts, a sprocket on said idling shaft, all of said sprockets in the same plane with each other, a driving sprocket chain trained about said sprockets with a stretch thereof extending between the sprockets on the clutches up and over one and down and under the other so that when the clutch on one drive shaft is operated the chain will be driven in one direction and when the other clutch is operated the chain will be driven in the reverse direction, and means for supplying fluid pressure to one or the other of said hydraulically operated clutches to effect a forward or reverse drive of the carriage by rotation of the cable drum in one direction or the other.

2. A feed unit for saw mill carriages and the like including a base, a cable drum and its shaft mounted on said base for rotation in either direction, which drum has carriage operating cables wound thereon, a pair of drive shafts rotatably mounted on said base, one on each side of said drum and its shaft, means for continuously driving said drive shafts in the same direction, a rotatable hydraulically operated clutch on each of said drive shafts, a sprocket wheel on each of said clutches and on the cable drum shaft, a driving sprocket chain trained in reverse directions about said sprockets on said clutches and about the sprocket on the drum, means for supplying fluid pressure to one or the other of said hydraulically operated clutches to effect a forward or reverse drive of the carriage by rotation of the cable drum in one direction or the other, said means including a separate operating cylinder for each clutch with a reciprocable piston therein, said cylinders mounted with their piston operating rods extending toward each other, and a manually operable lever pivotally mounted so as to extend between the ends of said piston operating rods so that it may be operated to apply pressure to operating fluid in one or the other of said operating cylinders.

MALVIN M. BARKSDALE.

References Cited in the file of this patent

UNITED STATES PATENTS

| Number | Name | Date |
|---|---|---|
| Re. 23,283 | Brown | Oct. 17, 1950 |
| 294,442 | Clark | Mar. 4, 1884 |
| 616,163 | Thompson | Dec. 20, 1898 |
| 909,139 | Bergen et al. | Jan. 12, 1909 |
| 1,197,090 | Adkins | Sept. 5, 1916 |
| 1,794,038 | Siddall | Feb. 24, 1931 |
| 2,197,063 | Ashton | Apr. 16, 1940 |
| 2,431,580 | Orr | Nov. 25, 1947 |
| 2,542,351 | Pease | Feb. 20, 1951 |
| 2,560,126 | Pease | July 10, 1951 |
| 2,574,974 | Johnson | Nov. 13, 1951 |